United States Patent
Bockus et al.

(10) Patent No.: US 9,960,972 B1
(45) Date of Patent: May 1, 2018

(54) CONTEXTUAL BACKUP AND RESTORE OPERATIONS

(71) Applicant: Spanning Cloud Apps LLC, Hopkinton, MA (US)

(72) Inventors: Gordon Bockus, Austin, TX (US); Patricia Cifra, Austin, TX (US); Joseph Porcheddu, Austin, TX (US)

(73) Assignee: Spanning Cloud Apps LLC, Hopkinton, MA (US)

( * ) Notice: Subject to any disclaimer, the term of this patent is extended or adjusted under 35 U.S.C. 154(b) by 349 days.

(21) Appl. No.: 14/788,543

(22) Filed: Jun. 30, 2015

(51) Int. Cl.
*G06F 15/173* (2006.01)
*H04L 12/26* (2006.01)
*G06F 11/14* (2006.01)
*H04L 29/08* (2006.01)

(52) U.S. Cl.
CPC .......... *H04L 43/04* (2013.01); *G06F 11/1402* (2013.01); *H04L 67/02* (2013.01)

(58) Field of Classification Search
USPC .................. 709/217, 218, 223, 224, 226
See application file for complete search history.

(56) References Cited

U.S. PATENT DOCUMENTS

| | | | | |
|---|---|---|---|---|
| 7,188,305 B1* | 3/2007 | Corbin | ............. | G06F 17/30899 707/999.2 |
| 8,291,233 B2* | 10/2012 | Pearson | ............... | H04L 63/102 713/185 |
| 8,595,691 B2* | 11/2013 | Ellen | ..................... | G06Q 30/02 717/106 |
| 8,694,589 B2* | 4/2014 | Buchheit | ............. | G06Q 10/107 709/203 |
| 8,886,706 B1* | 11/2014 | Tong | ................... | G06Q 10/107 709/203 |
| 9,357,013 B2* | 5/2016 | Shepherd | ............... | H04L 67/14 |
| 9,639,626 B2* | 5/2017 | Gnech | ............. | G06F 17/30899 |

* cited by examiner

*Primary Examiner* — Liangche A Wang
(74) *Attorney, Agent, or Firm* — Slater Matsil, LLP

(57) ABSTRACT

Systems and methods for providing contextual and dynamic views in a workspace are provided. A view can be based on contextual data from a workspace and page parameters that are associated with a location in the workspace. The view is then generated and loaded into the user interface of a workspace. Contextual data operations can be performed through the contextual and dynamically generated views.

20 Claims, 4 Drawing Sheets

CONTEXTUAL BACKUP AND RESTORE OPERATIONS

FIELD OF THE INVENTION

Embodiments of the invention relate to systems and methods for protecting data. More particularly, embodiments of the invention relate to systems and methods for providing contextual data protection operations without leaving a workspace of a cloud-based application.

BACKGROUND

Applications that are accessed over the cloud are increasingly available and are increasingly used. Cloud-based applications provide services that are accessed using a browser, for example. Cloud-based applications include, but are not limited to, customer relationship management applications, document management applications, office suite applications, data storage applications, and data protection applications.

Cloud-based applications often result in the generation of data in various forms such as documents, databases, spreadsheets, videos, notes, other files or data and the like or combination thereof. Some cloud-based applications are configured to be used with other cloud-based applications. For example, a backup application may be configured to backup data associated with another cloud-based application. A cloud-based backup relieves a user from managing the backups while providing many of the benefits associated with backups such as the ability to access the data as it existed at a specific point in time.

The ability to access and use backup data from the context of the web application used to work with the data is complicated. Part of the complexity relates to the way in which the web application is viewed and accessed. A web interface (or workspace) can be presented in a wide variety of ways. Web pages can be very diverse in terms of how data is presented therein. The context of one web page may different from the context of another web page. Also, different locations or portion of the same web page may have different contexts. In addition, the devices on which a workspace may be presented can vary at least in terms of screen real estate and resolution. Systems and methods are needed to provide contextually aware backup and restore operations without leaving the workspace of a cloud-based application.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
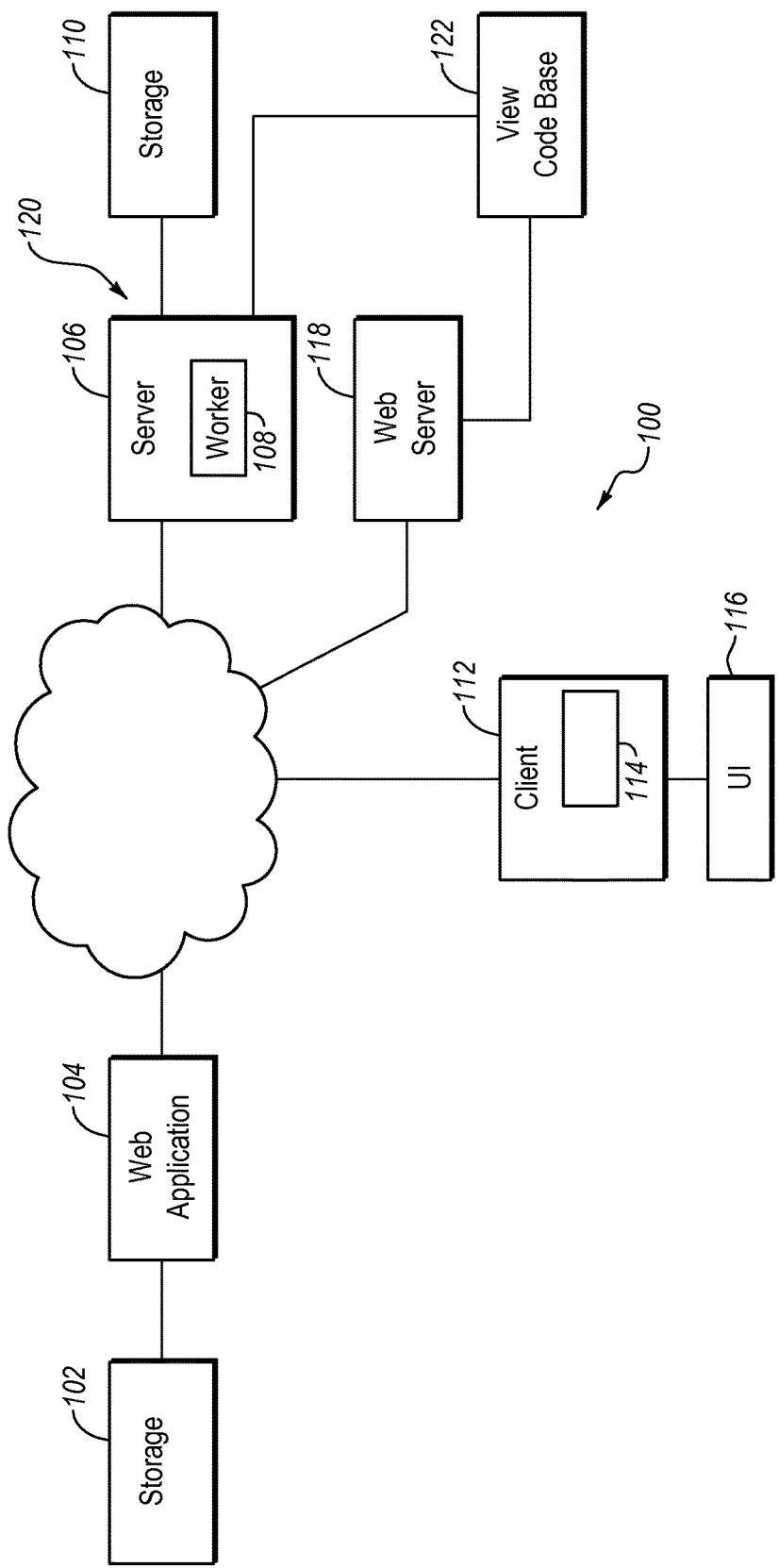
FIG. 1 is an example of a cloud environment in which embodiments of the invention may be implemented.

Embodiments of the invention generally relate to protecting data in a distributed environment such as the cloud or Internet. Embodiments of the invention may also be implemented in other network configurations including local area-networks. Embodiments of the invention provide systems and methods for generating a contextual view of a data protection application or portion thereof that may be presented, displayed, and/or accessed in the workspace of a different web application. For the following discussion, a web application is an application to which one or more users or clients subscribe or use over the cloud. The web application is discussed in the context of a data protection application. However, embodiments of the invention are not limited to relationships between a web application and a data protection application. The data protection application may be an application that is configured to at least backup and/or restore data associated with the web application. Both the web application and the data protection application may be cloud-based applications.

A web application may be, by way of example and not limitation, an application that is accessed over the cloud. Data associated with the application may also be stored in the cloud. The web application may be accessed with a browser operating on a client. The web application may also be associated with a piece of software operating locally on the client. Examples of a web application include, but are not limited to, customer relationship management (CRM) applications, office suite applications (e.g., word processing, spreadsheets, presentations, videos, audio, databases, email), data storage applications, and data protection (e.g., backup and/or restore) applications.

When a client or user uses or accesses the web application, the user may be presented with a workspace, often in the form of one or more web pages or a user interface that may be displayed in a browser. The content of the workspace can be presented in a wide variety of forms and may incorporate a wide variety of elements that may be web-based. The workspace may include web pages arranged in a tabbed arrangement. The workspace may include links, buttons, radio buttons, links, menus of various types, feeds, or the like or any combination thereof. One of skill in the art can appreciate the different ways in which data or content is displayed in a workspace as well as the different ways in which data and or commands can be input into a workspace or a web page.

Embodiment of the invention relate to providing content or data or applications associated with the data protection application in the workspace of a web application. More specifically, embodiments of the invention enable the view to be dynamically generated and contextually aware of location of the workspace in which the view is presented. In one example, the view to be displayed in the workspace of the web application may be determined at load time and can account for a display type, location in the workspace, the type of content being displayed, and/or the content of the workspace.

The factors or parameters that allow the view of the data protection application to be dynamically and contextually generated can be read by a server and saved into a session so they can be loaded into the browser as necessary. In one example, the workspace (or application associated with the workspace) may provide or post parameters to the data protection application. These parameters provide detail used in generating the contextual view and are typically related to the location in which an application of the data protection application runs. For example, these parameters can provide the data protection application with the location in which the view will be embedded in the workspace as well as the type of content. Other parameters may be determined by the data protection application and/or by a web server associated with the data protection application.

With the parameters provided by the workspace, the data protection application can dynamically prepare a view for presentation in the workspace. In one example the data protection application includes a single web application to generate the view. Different form factors throughout the workspace can be dynamically generated without having to maintain more than a single code base. The backing clientside services can be shared across all views that may be dynamically generated. In one example, different HTML templates can be created and can then be styled appropriately for the context of the workspace. Example templates include a restore template, a feed template, an object restore template and a full web page template.

The modules that make calls to the server and that maintain the data may be shared across all views. In one example, the workspace may have multiple locations in which a view of the data protection application may be provided and all views can be generated from a single code base. The specific view depends on information provided by the workspace, the browser type, and/or page parameters of the data protection application. A view may be generated to load into a feed context, a mobile view context, a full web view context, a specific object backup context, a general data backup context, a specific object restore context, a general restore context, or the like or combination thereof.

For example, a workspace may display an object view (e.g., data of a specific customer) and a restore button. When the restore button is selected, the web application may post information to the data protection application. The posted information may identify that a specific object is being displayed and that a restore button has been selected. This information allows the data protection application (or an associated web server) to navigate to an object restore view that may be presented to the user in the workspace of the web application.

Embodiments of the invention allow the data protection application or a web server to account for all of the different locations of the workspace in which a view may be presented without having multiple code bases. This allows the data protection application or associated web server to use the information posted by the workspace, the type of device, and other parameters determined by the web server to load simple views, mobile views, full web applications, or the like from a single code base without leaving the workspace.

FIG. 1 illustrates an example of an environment in which embodiments of the invention may be implemented. FIG. 1 illustrates an example of a network or cloud 100. The network 100 may be or include the Internet and is an example of the cloud. The cloud 100 allows a client 112, a web application 104, and a data protection application 120 to communicate with each other. Embodiments of the invention extend to multiple web applications or other services and/or multiple clients that may or may not be related.

FIG. 1 illustrates a client 112 that can connect with the cloud 100. The client may be a computer, server computer, tablet device, mobile device, smartphone, or the like and may include one or more processors. The client 112 may have some software operating locally. For example, the client 112 may include a browser that may be used to access websites and applications residing in or accessible over the cloud 100. The client 112 may also include a module 114 that may be specific to a particular web-based application, such as software as a service (SaaS).

The client 112 can communicate or connect with the web application 104 over the cloud. The web application 104 is an example of a cloud-based application and/or data that is provided over or made accessible over the cloud 100 to the client 112. The web application 104 may include one or more server computers and other related hardware and software. The web application 104 may include one or more processors configured to operate or provide one or more applications over the cloud 100.

The data and/or applications of the web application 104 can be accessed using a browser and/or local software (e.g., module 114) installed on the client 112. The web application 104 represents applications such as SaaS or other applications. The web application 104 may be associated with a specific user or client or with multiple clients of the same entity or with multiple clients of multiple entities or users. The 104 may include SaaS. Data and/or applications associated with the web application 104 may be stored in storage 102, which may include multiple storage devices. The storage 102 may range from a single memory device to a datacenter.

For example, the client 112 may subscribe to the web application 104 or to a service provided by the web application 104. The web application 104 may include applications related to the creation, manipulation, and/or management of documents, spreadsheets, pictures, videos, contacts, calendars, databases, emails, other files or data and the like or combination thereof. For example, the applications provided by the web application 104 may include applications that allow a client 104 to work with word processing documents, spreadsheets, slide presentations, calendars, email, databases, or the like in a cloud-based context. The data of the client 112 that subscribes to the web application 104 may be stored in the storage 102. In another example, the web application 104 may provide contact management or customer relationship management.

The data protection application 120 is an example of a cloud-based application. The data protection application 120 may be provided by a server 106, storage 110, and/or a web server 118. The web server 118 may include a single code base 122 used to generate multiple contextual views of the data protection application.

In one example, the server 106 may be configured to backup data of the client 112 that is stored on the storage 102. The server 106 may store backups of the data on the storage 102 on the storage 110. The storage 110 may include one or more hard drives or other memory and may range from a single device or memory to a datacenter.

The server 106 may control a worker 108, which may be an example of a process that is configured to perform a backup operation and/or a restore operation. The worker 108 may include one or more processors or may be configured to be executed by one or more processors. When instructed, the worker 108 may perform a backup of the client's data to and/or restoration of the client's data from the storage 110.

When the client 112 is using the web application 104, a user interface 116 may be displayed on the client 112. The user interface 116 is displayed on a display or screen and is an example of a workspace of the web application 104. The user interface 116 may include multiple types of views of content that may include, but is not limited to, feeds, text, video, buttons, links, tabs, pages, or the like or combination thereof. Some of the user interface 116 may be populated with content that is generated by the server 106 or another web server 118 associated with the server 106.

The user interface 116 is configured, in one example, such that at least a portion of the user interface 116 is sourced from another location outside of the web application 104. Embodiments of the invention ensure that the portion of the user interface 116 that may be sourced from the server 106 or 118 is dynamically presented and accounts for the context of the user interface 116 presented by the web application 104.

Figure 2:
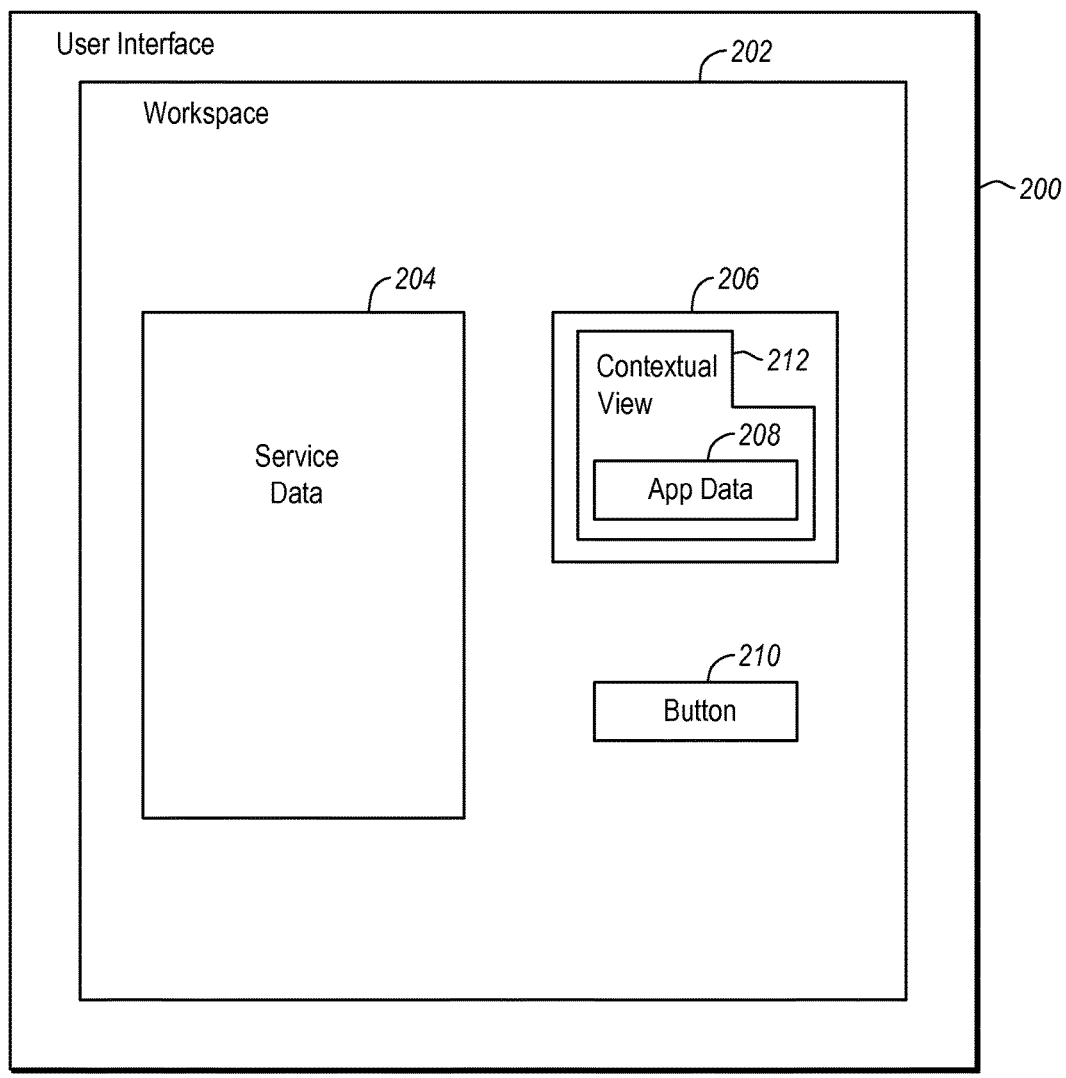
FIG. 2 is a block diagram of a workspace of a web application and illustrates a dynamically generated contextual view of a data protection application or portion thereof in the workspace of the web application.

FIG. 2 illustrates an example of a user interface associated with a service or a cloud-based application. A user interface 200 may display a workspace 202 of the service 202. When the data protection application is installed, one of the tabs or pages in the workspace may correspond to the data protection application. This tab may show information related to the backup operations and/or restore operations performed by the data protection application.

The workspace 202 may provide multiple views. The views may include a feed, a full web page, or the like. The workspace 202 may include data that is displayed in a portion 204 of the user interface 200. The portion 204 may constitute the entire display in some examples.

The ability to provide a contextual view inside of the workspace may begin when the web application or workspace posts data to the data protection application. This data identifies some of the context. For example, assuming that the location 206 corresponds to a feed, the post from the web application to provide a view for the feed may identify that the location of context is a feed. With this information, the web server 118 or data protection application can navigate to a view using the single view code base 122 to identify data for this context. In addition, the web server 118 may identify other parameters for this view. When the context is a feed, then the view may include text as well as size parameters such that the text can be posted back to the feed. In the context of a feed in the location 206, the app data from the web server 118 or from the data protection application may include text to be presented in the contextual view 212.

The post from the workspace 202 may also identify additional information about the feed. Thus, the text may be related to a specific action, such as completion of a backup or of a restore operation or of an increase in api calls.

In another example, the location 206 may be a new tab and the post from the workspace may identify that an object is being restored. The web server 118 may then navigate in the code base 122 to a restore object view that may be presented in the location 206 (which may be a tab). The contextual view 212, in this example, may shoe the object being restored as well as a history of changes to the object. The contextual view 212 may also allow the data to be restored to be selected.

Stated more generally, embodiments determine the state to be loaded into the contextual view based on the context provided by the workspace 202, the browser specific information (e.g., mobile or standard browser), and/or page parameters configured by the data protection application.

The portion 204 can be arranged in many different arrangements and views. The portion 204 is representative of all different forms or combinations of content that may be displayed in a user interface 200. The portion 204 may include one or more tabs, buttons, links, data, video, audio, images, pages, or the like or combination thereof. The portion 204 may include or present an application that is used by a client or user via the user interface 200.

The user interface may also include a location 206 that may correspond to a portion of the workspace that may be at least partially rendered by the data protection application. The location 206, in one example, may correspond to an embedded application such as a feed. Dynamically generated content from the server 106 or a web server 118 associated with the server 106 may provide content for the location 206. App data 208 may be embedded in or included in the location 206. The app data 208, which is generated by the server 106 may be dynamically adapted for the context of the location 206 an or for the user interface 200 or workspace.

For example, if the location 206 constitutes a feed, the app data 208 may constitute a post to the feed that is related to the data protection application and/or to the information being provided in the feed. The app data 208 may identify api views, backup status, recovery status, or the like.

The dynamically generated content may also include a button 210. The button 210 may instruct a backup and or restore of data presented in the portion 204. For example, the portion 204 may be a document and the button 210, when selected by a user, may initiate a restore of the document as it existed at a previous time. The portion 204 may include customer relationship management data (e.g., a contact) and the button 210 may initiate a restore or backup of the contact.

When installed, the data protection application examples illustrate that when the button 210 (or app data 208 or the like) is selected, the context of the portion 204 (e.g., the location of the portion 204 in the application provided by the web application 104 or in the user interface 200) is used to generate the response of the server 106.

In one example, the data protection application can determine a context of the location 206. The view that is provided in the location 206 is customized for the context. A single code base 122, in one example, can be used to generate all views. However, the various views may be customized according to context. A mobile view, for example, is different from a full web page view, which is different from a feed view. Further, multiple locations in the workspace 202 of the web application 104 may include links that launch the data protection application. The resulting views may be determined according to the context of the location in the workspace 202 and page parameters determined by the data protection application.

In one example, the web application 104 may allow the data protection application to create apps. Effectively, the apps created in the web application 104 allow a third party application to be integrated into the workspace of the web application 104. As shown in FIG. 2, the data protection application can provide a button 210 in many locations and views of the workspace 202. When selected to access the data protection application, the resulting view provided by the data protection application is contextually provided. Thus, the data protection application can dynamically generate a view that accounts for the context of the view in which the data protection application was accessed. By creating apps in this manner in different locations of the workspace 202, the data protection application can be accessed in feeds, in a mobile environment, as a web page, as an event, or the like. In one example, some of the context is posted to the created app. In another example, context can be retrieved.

Figure 3:
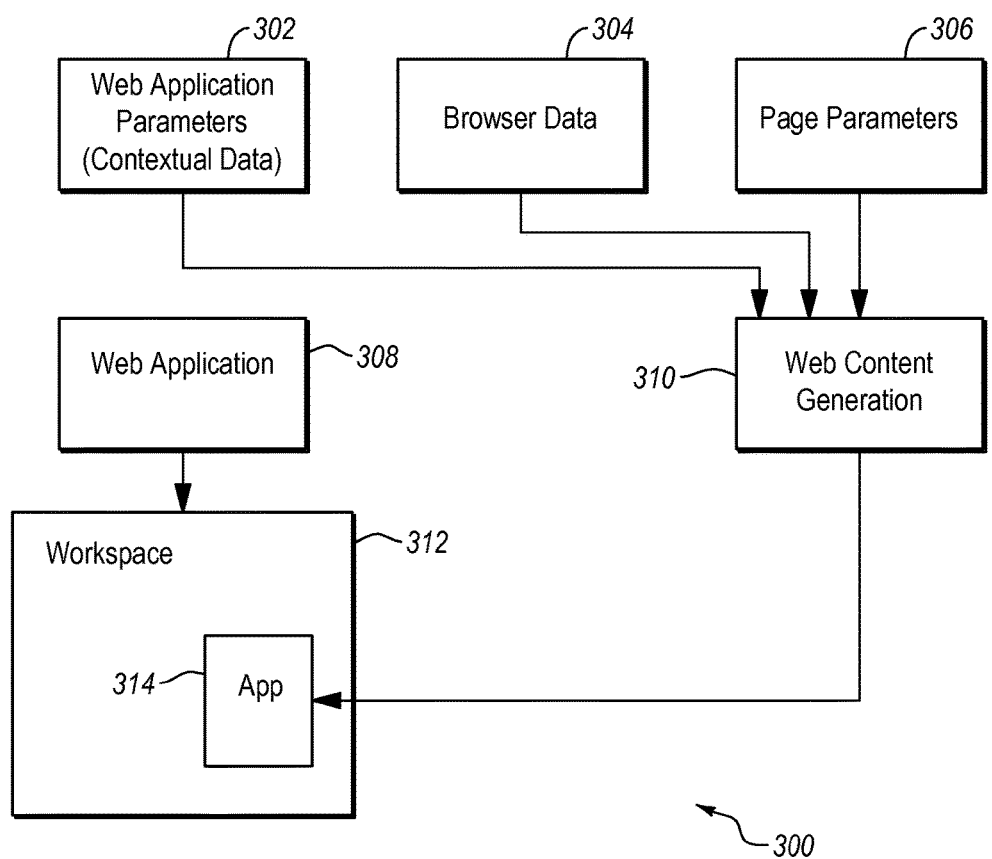
FIG. 3 illustrates an example of generating the contextual view of the data protection application that is presented in the workspace of the web application.

FIG. 3 illustrates an example for generating the contextual view of the data protection application that is presented in the workspace of the web application. FIG. 3 illustrates a workspace 312 of a web application 308, which is an example of the web application 104. In this example, an app 314 has been created by the data protection application at a location in the workspace 312. When the app 314 is accessed, the workspace 312 posts data. The post 302 includes a first layer of contextual data such as web application parameters. The post 302 may identify the location and context. For example, the post 302 may identify whether the app 314 is associated with a feed, or in the context of displaying an object, or the like. The post 302 is provided to a web application for web content generation 310.

Next, browser data 304 is determined and provided to the web content generation 310. In one example, a determination may be made by the data protection application (or by a server or web server thereof) whether the browser is a mobile browser or a standard browser. This type of information can determine how the content being generated is formatted and may be used to determine what is included in the generated content.

Page parameters 306 are also provided to the web content generation 310. The page parameters 306 may be determined when the app is initially embedded into the workspace 312. The page parameter can be used to specify exactly what view should be rendered. The page parameter 306 also allows the code base to be navigated to a specific view.

For example, the post 302 may identify that the location is a feed. The page parameters 306 may then specify the size of the contextual view such that the contextual view will fit inside the feed when posted. The text to include in the post may also be determined from the post 302 and/or the page parameters 306. When the view is ready, the contextual view may be displayed in the app 314 or in a particular location of the workspace 212.

In another example, the data protection application may create an app this included in the workspace 312 when displaying a specific object. The workspace may also include a tab that displays the data protection application. When the app is accessed in the context of displaying a specific object, the contextual data included in the post 302 may indicate that an object is being displayed. The page parameters 306 may indicate that the view should include restore options for that object. Consequently, the resulting view that is displayed in the workspace may include versions of the object such that any errors in the object can be fixed.

Alternatively, when the app is accessed in the context of displaying the data protection application, the view may provide more general information about the backup and/or restore operations currently being performed and/or scheduled. Thus, the post 302 and the page parameters 306 result in a view that relates to the context of the workspace 312 being displayed. In addition, the contextual views can be displayed without leaving the workspace 312.

Figure 4:
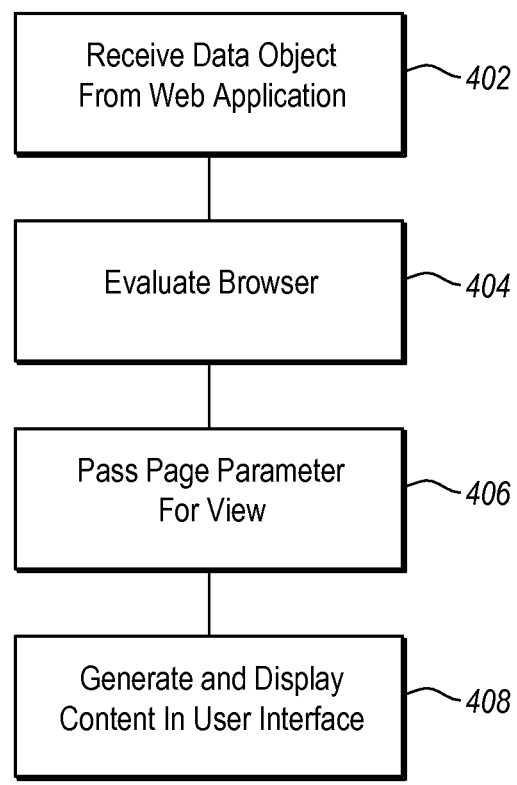
FIG. 4 is an example of a flow diagram for generating a contextually aware view that is presented in the workspace of a web application.

FIG. 4 is an example of a flow diagram for generating a contextually aware view that is presented in the workspace of a web application. In box 402, a data object (e.g., a post) is received from the web application. The data object may include information relating to the location in which the data protection application (or portion thereof) is accessed. This initial contextual data may identify an entry point for the view (e.g., a feed). In box 404, the browser is evaluated. A determination is made as to the type of browser (e.g., standard, mobile), which may impact the view.

In box 406, page parameters are passed to the web server. The web server uses the post, the browser information and/or the page parameters to navigate to a particular view. In box 408, the content to be displayed is generated and styled for display in the user interface or in the workspace.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. As well, such media are examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud com1puting environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for displaying a contextual view in a workspace of a web application, the method comprising:
    embedding applications in multiple locations of a workspace, wherein each application at each location enables access to a data protection application without leaving the web application;
    receiving a post from the web application when a first application at a location is accessed, wherein the post includes contextual information about content currently displayed in the workspace;
    determining a browser type of a client accessing the first application, wherein the browser type is determined such that a standard browser is selected when the workspace is a computer and a mobile browser is selected when the workspace is a mobile device;
    providing page parameters configured by the first application for the embedded applications of the workspace;
    generating the contextual view of the data protection application based in part on the contextual information, the page parameters and the browser type; and
    displaying the contextual view in the workspace of the web application at the location.

2. The method of claim 1, further comprising navigating to the contextual view based on the post and the page parameters.

3. The method of claim 1, wherein the contextual view is styled with a form factor based on the location accessed in the workspace.

4. The method of claim 1, wherein the post specifies a context and the page parameters representing a specific view.

5. The method of claim 1, wherein the post identifies a context of a feed and the page parameters identify a size for the view presented in the feed.

6. The method of claim 1, wherein the post identifies a context of launching a full data protection application and where the page parameters specify view that includes a full web page.

7. The method of claim 1, wherein the post identifies a view of a specific object and wherein the page parameters specify a view that present a restore of the specific object, the view includes one or more versions of the specific object.

8. The method of claim 1, wherein all views are generated with a single code base.

9. The method of claim 1, wherein the contextual information includes information about the location of the workspace.

10. The method of claim 9, wherein the location corresponds to a web page of the workspace.

11. The method of claim 9, wherein the location corresponds to a feed of the workspace.

12. The method of claim 1, wherein the data protection application is located remote from the workspace.

13. A non-transitory storage medium that stores a control program that causes a processor to execute:
    embedding applications in multiple locations of a workspace, wherein each application at each location enables access to a data protection application without leaving a web application;
    receiving a post from the web application when a first application at a location is accessed, wherein the post includes contextual information about content currently displayed in the workspace;
    determining a browser type of a client accessing the first application, wherein the browser type is determined such that a standard browser is selected when the workspace is a computer and a mobile browser is selected when the workspace is a mobile device;
    providing page parameters configured by the first application for the embedded applications of the workspace;
    generating a contextual view of the data protection application based in part on the contextual information, the page parameters and the browser type; and
    displaying the contextual view in a workspace of the web application at the location.

14. The non-transitory storage medium of claim 13, further comprising navigating to the contextual view based on the post and the page parameters.

15. The non-transitory storage medium of claim 13, wherein the contextual view is styled with a form factor based on the location accessed in the workspace.

16. The non-transitory storage medium of claim 13, wherein the post specifies a context and the page parameters representing a specific view.

17. The non-transitory storage medium of claim 13, wherein the post identifies a context of a feed and the page parameters identify a size for the view presented in the feed.

18. The non-transitory storage medium of claim 13, wherein the post identifies a context of launching a full data protection application and where the page parameters specify view that includes a full web page.

19. The non-transitory storage medium of claim 13, wherein the post identifies a view of a specific object and wherein the page parameters specify a view that present a restore of the specific object, the view includes one or more versions of the specific object.

20. The non-transitory storage medium of claim 13, wherein all views are generated with a single code base.

* * * * *